C. B. HENDERSON.
PLOW.
APPLICATION FILED FEB. 3, 1908.
904,326.
Patented Nov. 17, 1908.
2 SHEETS—SHEET 2.
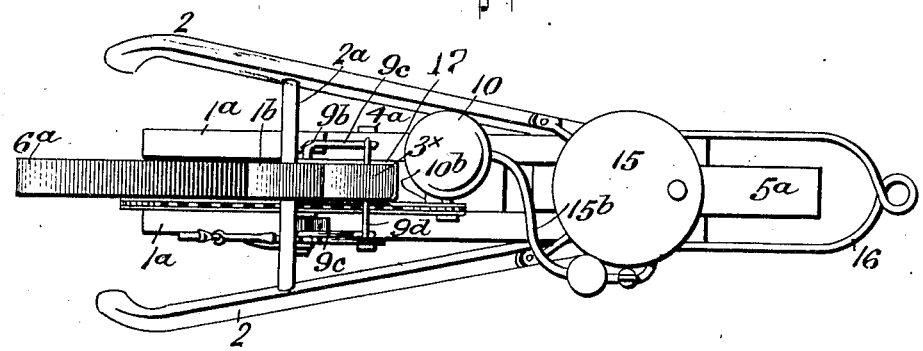
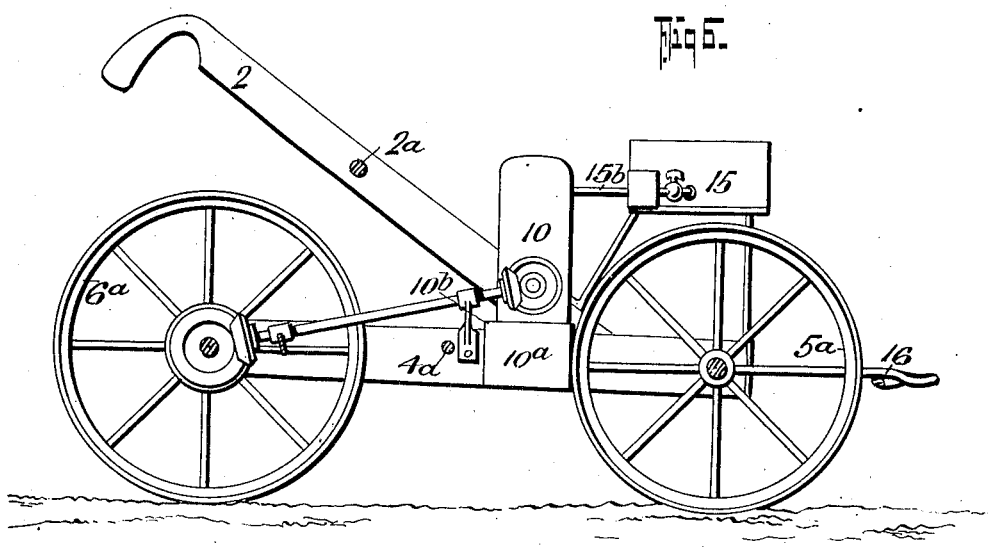
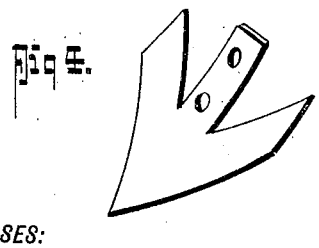
WITNESSES:
John T. Schrott
Charles H. Wagner
INVENTOR
Charles B. Henderson.
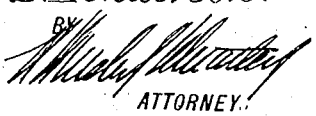
ATTORNEY.

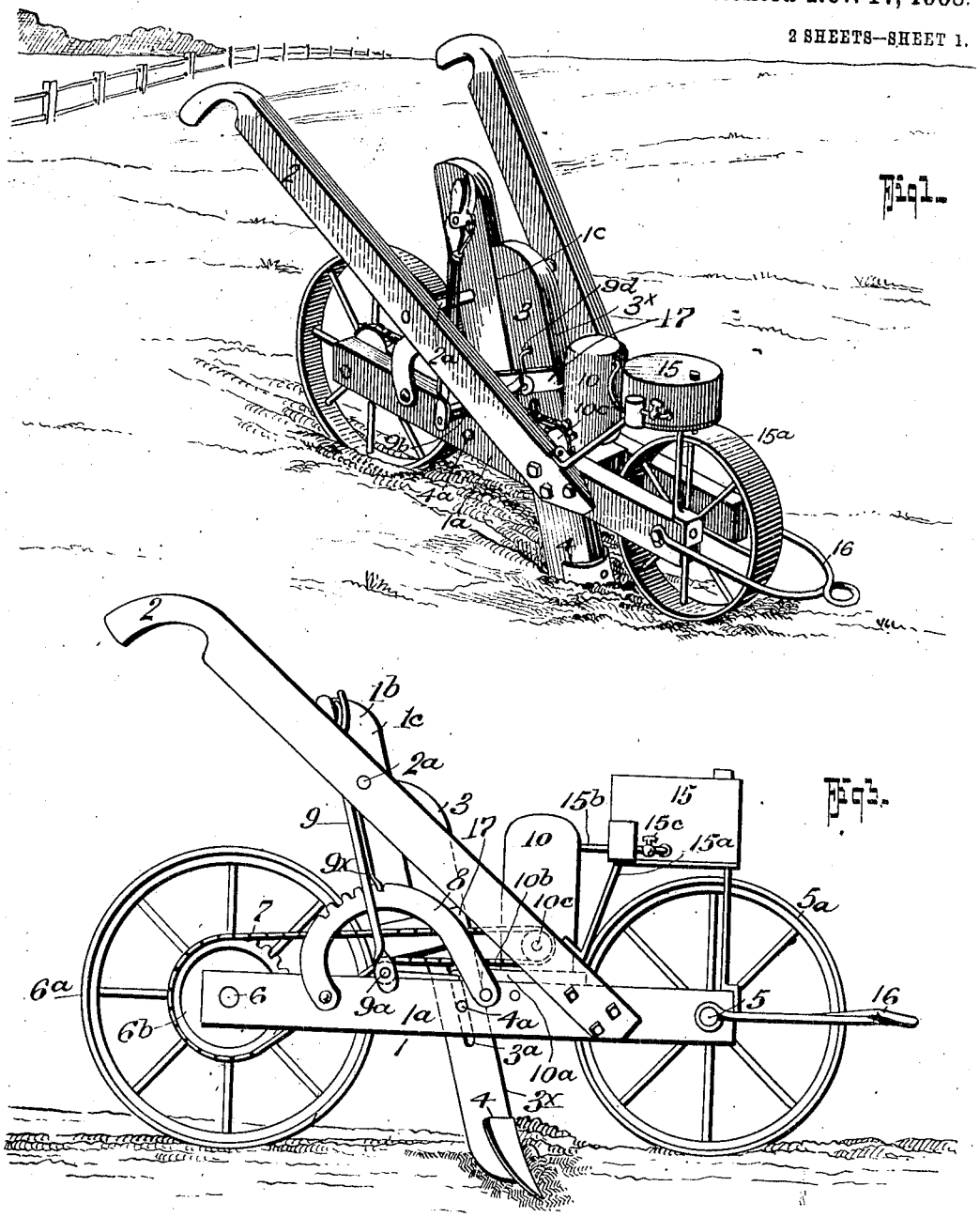

UNITED STATES PATENT OFFICE.

CHARLES B. HENDERSON, OF RAINIER, OREGON.

PLOW.

No. 904,326.  Specification of Letters Patent.  Patented Nov. 17, 1908.

Application filed February 3, 1908. Serial No. 414,122.

*To all whom it may concern:*

Be it known that I, CHARLES B. HENDERSON, residing at Rainier, in the county of Columbia and State of Oregon, have invented certain new and useful Improvements in Plows, of which the following is a specification.

My invention relates to certain new and useful improvements in plows, and it more particularly seeks to provide a plow of the garden type in which means are provided for propelling the plow over the ground and at the same time producing a plow of a simple and effective construction which can be easily and cheaply manufactured and which will readily and effectively serve its intended purposes.

In my invention means are provided for adjusting the plow share to different positions in order to penetrate to a greater or less distance into the ground as conditions may require, and to provide detachable shares for the plow so that it will be susceptible of numerous specific uses.

In its generic nature the invention comprises a wheeled frame having handle members connected therewith, and an adjustable plow carrying standard adjustably mounted in the frame together with an explosive engine carried by the frame and geared with one of the wheels of the plow, whereby the plow may be propelled.

With other objects in view than have been heretofore specified, the invention also embodies certain novel details of construction, combination and arrangement of parts, all of which will be first described in detail and then be specifically pointed out in the appended claims, reference being had to the accompanying drawings, in which:—

Figure 1, is a perspective view of a plow embodying my invention. Fig. 2, is a top plan view thereof. Fig. 3, is a side elevation showing my plow in use with the plow standard adjusted for projecting the plow share the greatest distance into the ground. Figs. 4 and 5, are detail views showing different plow shares secured to the lower end of the plow standard. Fig. 6, is a side elevation of a modification.

Referring now to the accompanying drawings, in which like numerals of reference indicate like parts in all of the figures, 1 designates the plow frame which consists of a pair of parallel beams $1^a$ spaced apart by the fixed standard $1^b$ that projects upwardly therefrom and by the base $10^a$ of the drive motor 10, hereinafter again referred to.

2—2 designates handle members secured to the beams $1^a$ and projecting upwardly, rearwardly and divergingly and connected by the bar $2^a$ that passes through the standard $1^b$.

The standard $1^d$ projects upwardly and rearwardly and has its front face $1^e$ adapted to be engaged by the adjustable standard 3 which carries the plow share 4 that is removably secured thereto at the lower end, as indicated. The adjustable standard 3 has a longitudinal slot $3^a$ through which a pin $4^a$ passes, the pin $4^a$ also passing through the beams $1^a$ and being secured thereto in any desired manner. The length of the slot $3^a$ limits the movement of the standard 3 and in order to hold the standard in proper position, the base $10^a$ of the motor 10 has its rear face $10^b$ held to abut the front face $3^b$ of the standard 3 and the beams $1^a$ to form a guide for the standard 3.

The motor 10, which may be an explosion engine of any approved type, has a drive wheel $10^c$ and the engine 10 receives its fuel from a supply tank 15 supported on standards $15^d$ over the beams $1^a$, a pipe $15^b$ connecting the tank 15 with the engine 10 and a suitably controlled valve $15^c$ is provided in the pipe.

Journaled in suitable bearings in the front of the beams $1^a$, is a shaft 5 on which the front wheel $5^a$ is journaled between the beams $1^a$, and at the rear the beams $1^a$ are joined by an axle 6 on which the drive wheel $6^a$ is mounted, the drive wheel $6^a$ being preferably of a greater diameter than the front wheel $5^a$ for a purpose which will presently appear. Secured to the drive wheel $6^a$ is a sprocket $6^b$ around which and around the engine sprocket an endless chain 7 passes, whereby the power from the engine may be transmitted from the drive wheel, suitable idler wheels being provided on stub shafts on the standards $1^b$ over which the chain 7 passes.

8 designates a segmental rack member secured to one of the beams $1^a$ to coöperate with the lever 9 that is secured to a shaft $9^a$ mounted in bearings $9^b$ on the beams $1^a$ and provided with arms $9^c$ that connect through links $9^d$ with the adjustable plow standard 3 so that as the lever 9 is moved, the standard 3 will be adjusted up and down as may be desired, and in order to lock the parts in their adjusted positions, the lever 9 has a latch member 9× to coöperate with the segmental rack.

Instead of connecting the motor 10 with the drive wheel through sprocket and chain connections, bevel gear and shaft connections may be used, as indicated in Fig. 6.

16 designates a draft member secured to the front axle of the plow, by means of which a horse may be hitched to the plow to aid in pulling the same over the ground in lieu of the motor 10, when it is not desired to use the same.

I am aware that heretofore plows with adjustable shares have been provided, and I am also aware that motor-driven plows have been provided, but so far as I am aware no plow has been heretofore provided embodying the features of construction set out in the appended claims.

In the practical use of my invention, the plow is driven over the ground by the drive motor 10, either alone or in connection with horse power, and the plow beam 3 is adjusted to project the plow share the desired distance into the ground, after which the plow may be manipulated in the usual manner, as will be fully understood by those skilled in the art. Owing to the fact that in my construction of plow, the drive wheel and front wheel are in the same alinement, and follow the line of cut it is desired to make, the diameter of the rear wheel is greater than that of the front wheel as the rear or drive wheel runs in the cut that has been made, while the front wheel runs over the unbroken ground, see Fig. 3.

In order to use my invention as a ditching plow, a different form of plow share would be used in lieu of that shown in the drawings, as will be readily understood by those skilled in the art, an illustration of such use, it is thought will be unnecessary, as I make no claim to the specific plow share or working implements that are to be secured to the standard 3.

In order to aid in holding the plow carrying standard in proper position and give strength thereto I may provide a U-shaped member 17 that embraces the standard 3 and that may be secured to the standard 1ᵇ, as indicated.

From the foregoing description, taken in connection with the accompanying drawings, it is thought the complete construction, operation and numerous advantages of my invention will be readily understood by those skilled in the art to which the invention appertains.

What I claim is:

1. In a plow, the combination with the plow beams, a fixed standard secured thereto and projecting upwardly therefrom, a longitudinally adjustable plow standard carried by said plow beams and held in contact with said fixed standard, handle members secured to said beams and connected with said fixed standard, means for longitudinally adjusting said adjustable standard, a plow share carried by the adjustable standards, a pilot wheel mounted at the front of said beams, and a drive wheel at the rear thereof, and means supported by the plow beams and coöperatively connected with the drive wheel for driving the plow.

2. In a plow, a frame composed of a pair of beams spaced apart, a fixed standard secured between said beams and projecting upwardly and rearwardly therefrom, a drive motor having a base secured between said beams and adjacent said fixed standard but spaced therefrom, a longitudinally adjustable standard mounted between said beams and said fixed standards, and said motor base, means for adjusting said adjustable standard, a plow share secured to said adjustable standard, a pilot wheel and a drive wheel mounted in said frame and gear connections between said motor and said drive wheel.

3. In a plow, a frame composed of a pair of beams spaced apart, a fixed standard secured between said beams and projecting upwardly and rearwardly therefrom, a drive motor having a base secured between said beams, and adjacent said fixed standard but spaced therefrom, an adjustable standard mounted between said beams, said fixed standard and said motor base, means for longitudinally adjusting said adjustable standard, a plow share secured to said adjustable standard, a pilot wheel and a drive wheel mounted in said frame, gear connections between said motor and said drive wheel.

4. In a plow, a frame composed of a pair of beams spaced apart, a fixed standard secured between said beams and projecting upwardly and rearwardly therefrom, a drive motor having a base secured between said beams, and adjacent to said fixed standard but spaced therefrom, a longitudinally adjustable standard mounted between said beams and said fixed standard and said motor base, said adjustable standard having a longitudinal slot and a pin passing through said beams and said longitudinal slot of the standard, and hand operated lever means for adjusting said adjustable standard.

5. In a plow, a frame composed of a pair of beams spaced apart, a fixed standard secured between said beams and projecting upwardly and rearwardly therefrom, a drive motor having a base secured between said beams, and adjacent to said fixed standard but spaced therefrom, a longitudinally adjustable standard mounted between said beams and said fixed standard and said motor base, said adjustable standard having a longitudinal slot and a pin passing through said beams and said longitudinal slot of the
5 standard, hand operated lever means for adjusting said adjustable standard, and a strap secured to said fixed standard and embracing said adjustable standard, said adjustable standard having means for receiving plowing implements.

CHARLES B. HENDERSON.

Witnesses:
C. SNYDER,
J. B. DOAN.